United States Patent [19]

Andrea, III et al.

[11] 4,234,959
[45] Nov. 18, 1980

[54] DUAL THRESHOLD REPEATER SQUELCH CIRCUIT

[75] Inventors: Ralph W. Andrea, III, Sunrise; Leonard W. Bennett, Plantation; William W. O'Connor, Coral Springs, all of Fla.

[73] Assignee: Motorola, Inc., Schaumburg, Ill.

[21] Appl. No.: 57,047

[22] Filed: Jul. 12, 1979

[51] Int. Cl.³ .............................................. H04B 1/10
[52] U.S. Cl. ..................................... 455/35; 455/11; 455/219
[58] Field of Search .................. 455/35, 212, 218–221, 455/225, 11

[56] References Cited

U.S. PATENT DOCUMENTS

| 3,584,304 | 6/1971 | Casterline | 455/225 |
| 3,899,739 | 8/1975 | Herman | 455/35 |
| 3,902,122 | 8/1975 | Sisson et al. | 455/35 |

*Primary Examiner*—Jin F. Ng
*Attorney, Agent, or Firm*—Margaret Marsh Parker; James W. Gillman

[57] ABSTRACT

In a mobile repeater system there can be two priority repeaters at two adjacent locations which are out of range of each other, but not out of range of each other's portable units. Reception of a tone coded signal from a portable raises the squelch threshold in both repeaters, thus decreasing the portable-to-repeater range without decreasing the repeater-to-repeater range. Interferences caused by simultaneous transmission is eliminated since only the appropriate repeater is activated.

7 Claims, 3 Drawing Figures

DUAL THRESHOLD REPEATER SQUELCH CIRCUIT

BACKGROUND OF THE INVENTION

This invention relates to the field of two-way communication systems including repeaters, and particularly to the prevention of interference caused by two repeaters hearing the same portable unit.

Many two-way communication systems are known which include a base station and a multiplicity of vehicles, each vehicle containing a mobile transceiver, a repeater and a portable unit. Typically, the mobile transceiver communicates with the base station on one or two frequencies. When the portable unit is removed from the vehicle, as at the scene of a police investigation, the repeater in that car is activated to communicate with the portable on another frequency, the repeater serving as a link between the portable and the transceiver in the vehicle. When it is desired to transmit back to the base station a coded tone signal (CTCSS) is transmitted to the repeater unit. For portable-to-portable transmission at the location, the tone is not transmitted to the repeater, and the repeater does not couple the received message to the mobile transceiver for transmission to the base.

Prioritizing schemes have been developed whereby only one repeater at one location will communicate with all portables at that location. The presence or absence of the coded tone is utilized in some prioritizing schemes. Two such schemes are disclosed in U.S. Pat. Nos. 4,056,779 and 4,056,780, both assigned to the same assignee as is the present invention.

It may, however, happen in a densely populated area that two such investigations may be in progress in close proximity at the same time, and there would normally be two repeater units having priority status. In such a case, it is possible for a man carrying a portable unit to be within the receiving and squelch range of both priority repeaters although the repeaters are out of range of each other. When he transmits a message intended for his own priority repeater, each priority repeater receives his message and couples it to the associated mobile transceiver for transmission back to the base. This, of course, causes interference and, conceivably, loss of vital information. It would be advantageous to be able to reduce the receiving range of a repeater for portable-to-base transmissions only, while maintaining a more extended range for repeater transmissions, since the latter is necessary in order to establish a priority vehicle at that location.

Systems with dual squelch controls are well known, using a manually operated switch to enable either a standard carrier/noise controlled circuit or a squelch circuit which only opens when a coded tone signal is received. In the first mode, all signals of the proper frequency will be received, while in the latter mode, only those messages intended for that unit will be heard. Other dual squelch systems detect both carrier and coded tone simultaneously at all times.

SUMMARY OF THE INVENTION

It is an object of the present invention to provide a dual threshold squelch which is automatically enabled in the proper one of two modes as determined by the received signal.

It is a particular object to enable a wide range (low threshold) squelch control for signals received from other repeaters, and a narrower range (higher threshold) squelch control for tone coded signals coming from a portable unit.

These objects and others which will become apparent are achieved in a circuit in which the gain of a squelch amplifier stage is changed in response to the detection of a coded tone on the receive signal. The change in gain may be accomplished by switching an additional resistor in parallel with the emitter resistor of the gain stage, or by providing two squelch controls with separately adjustable settings and switching the appropriate control into the amplifier output circuit.

DETAILED DESCRIPTION OF THE PREFERRED EMBODIMENT

The dual threshold squelch circuit is shown and described in the environment of a particular type of communication system, but this is done only for ease of understanding and is not to be construed as a limitation on the invention.

Figure 1:
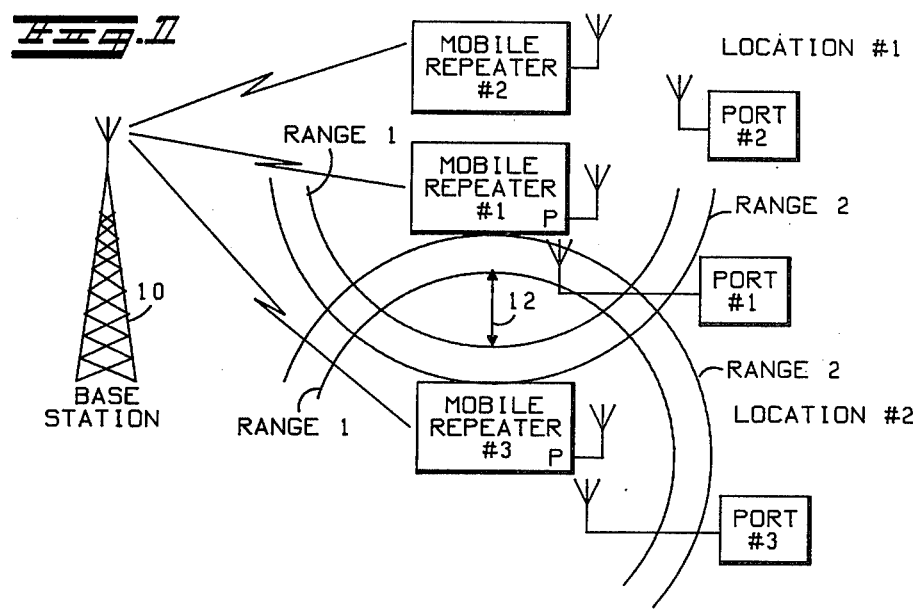
FIG. 1 is an illustration of a two-way communication system such as might utilize the present invention.

FIG. 1 illustrates a two-way communication system including a Base Station 10, Mobile/Repeater Unit #1 (priority unit for Location #1), Portable Unit #1, Mobile/Repeater Unit #2, also at Location #1, with associated Portable Unit #2, Mobile/Repeater Unit #3, (priority unit for Location #2) and associated Portable Unit #3. The situation shown might involve a large city police communications network wherein at least some police vehicles would be equipped with two-way radios. Such radios typically include a mobile transceiver which communicates with the Base Station 10 on one or two (frequency multiplexing) channels. Each vehicle would also include a relatively low power Portable Unit which may form a portion of the mobile transceiver when plugged into the transceiver, or may simply be charged in this manner. When a police officer unplugs the Portable Unit in his vehicle and sets out on foot patrol or in pursuit of a law breaker, he may need to communicate with the other officers at the same Location, or with the Base Station 10. In the latter case, his message must be picked up and repeated out by a higher powered Mobile/Repeater Unit.

In order for the Mobile/Repeater Unit to know that a message from a Portable Unit should be repeated out to the Base Station 10, a coded tone is transmitted with the desired message by the Portable Unit. This tone is typically sufficiently below the lowest audio frequency transmitted that it can be filtered out of the audio circuit and separately detected. To avoid interference in transmission, caused by his message being repeated out by more than one Mobile/Repeater at that location, priority systems have been developed. Two such systems are referenced hereinabove. For the purpose of the present invention, it is only necessary to know that, in order to establish one Mobile/Repeater at a given Location as the priority vehicle, each Mobile/Repeater must be able to receive the transmission of the other units at the same Location. This receiving range has been designated herein as Range #2 for each of the Locations #1 and #2 of FIG. 1. It will be seen that Mobile/Repeater #1 can receive Mobile/Repeater #2, but not Mobile/Repeater #3, which is the priority unit at Location #2. In a thinly dispersed population area, there would probably be no problem if the receiving Range #1 for Portable Unit transmissions was equal to Range #2, but in congested areas, Locations #1 and #2 may be close enough together that an officer on foot (with Portable Unit #1) could be equidistant the Mobile/Repeaters #1 and #3. Since both of the latter are priority units, each would attempt to repeat the message from Portable Unit #1 back to the Base Station 10; i.e. if both Mobile/Repeaters #1 and #3 detected a strong enough signal to activate the respective squelch circuits.

Figure 2:
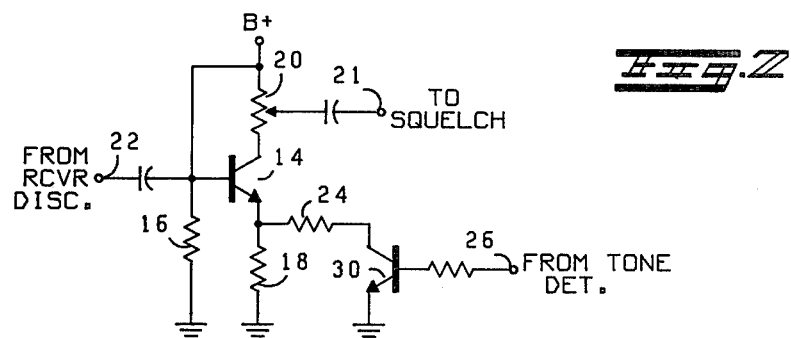
FIG. 2 is a schematic diagram of one embodiment of the invention.
Figure 3:
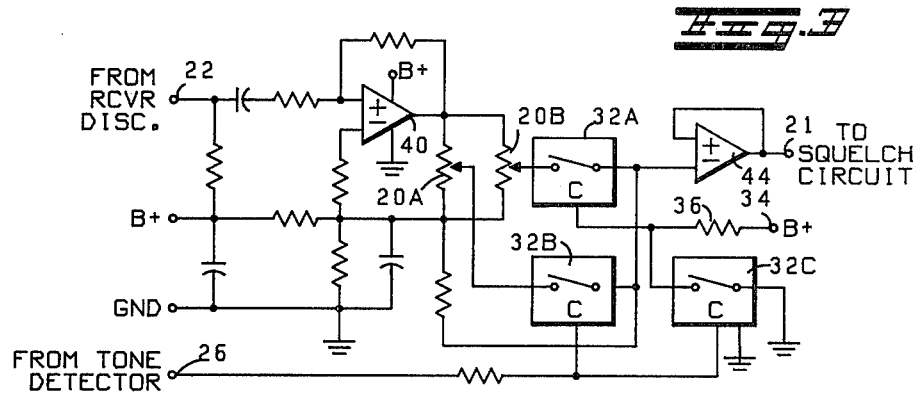
FIG. 3 is a schematic diagram of another embodiment of the invention.

As will be seen with respect to FIGS. 2 and 3, the squelch circuitry of the present invention provides for a higher squelch threshold for signals including the coded tone (from a Portable Unit) than those signals lacking the tone (from another Repeater). This feature is indicated by the reduced area of the Ranges #1 for coded tone squelch operation.

While FIG. 1 is not drawn to scale, it will be apparent that, under certain circumstances, the Ranges #1 could overlap, as in the area 12, or that even the Ranges #2 might not overlap. However, extensive interference measurements in the field indicate that it is quite possible to adjust the two squelch ranges for minimum interference in a given communication system.

FIG. 2 shows a dual threshold squelch amplifier circuit having a single manual gain adjustment. An amplifier transistor 14 is coupled between the B+ supply and ground with a base-to-ground resistor 16, an emitter-to-ground resistor 18, and a supply-to-collector resistor 20, which is the customary squelch pot. In such equipment, the squelch pot is not normally adjustable by the user, but is a factory or installation adjustment.

The tap of the squelch pot 20 is coupled to the customary squelch circuit via terminal 21. The input terminal 22 couples an output of the receiver discriminator to the base of the transistor 14. Coupled to the emitter of the transistor 14 is a resistor 24, which parallels the resistor 18 when a coded tone detect (logic "high") signal comes from the tone detector via terminal 26, enabling transistor 30 to conduct. In a typical case, coded tone detection would raise the gain of the stage by several decibels.

Since the embodiment of FIG. 2 merely increases the gain of the stage by a small amount for portable-to-base reception, another embodiment was developed. As shown in FIG. 3, this circuit includes two squelch pots 20A, 20B, and three analog switches 32A, 32B and 32C. These three switches may be implemented by three sections of a quad analog switch such as the Motorola MC14016 (the fourth section would be completely grounded), however, other switching circuits could be used. Each switch will close when a logic high is coupled to the respective control terminal C.

B+ from a terminal 34 is coupled through a large resistor 36 (e.g., 100,000 ohms) to the control terminal C of the switch 32A, so that it is normally closed. When, however, the coded tone detect signal is coupled to the control terminal of switch 32C from the terminal 26, switch 32C closes, grounding the control terminal of switch 32A and causing the latter to open. The switch 32C, controlled by the tone detect signal, thus functions to invert the control signal of the switch 32A. At the same time, switch 32B has also been closed by the tone detect signal from the terminal 26.

It will be seen that, with switch 32A closed and switch 32B open, squelch control 20B forms part of the circuit of a differential amplifier 40. Likewise, when switches 32B and 32C close, and switch 32A opens, squelch control 20B is disconnected from the amplifier circuit and squelch control 20A becomes the controlling element.

The output of the amplifier 40 is thus controlled alternately by the parallel squelch controls 20A and 20B, depending on whether the coded tone has been detected on the received signal. Again, the control settings are normally adjusted only at the time of installation, not by the user. The controlled output voltage is then coupled through a buffer stage 44 to the squelch circuit input terminal 21. The amplifier 40 will preferably be a differential amplifier as shown, with a highpass (3300 Hz) filter input to provide higher gain at the noise frequencies and prevent clipping of the voice signals which would produce higher order harmonics. With the embodiment of FIG. 3, a usable squelch difference of 15 db or more is easily obtained, a completely satisfactory value as shown in field tests of the system.

It should be noted here that the portable-to-repeater range and repeater-to-repeater range are dissimilar in the following respect. A portable-to-repeater signal is considered to be out of range when a portable unit cannot be detected at all by a given repeater, whereas a repeater-to-repeater signal is considered to be out of range when the transmission is weak enough that the squelch line of the receiving repeater momentarily resquelches for more than a few milliseconds. Such a break in the detectable transmission could allow any receiving repeater to assume priority and start repeating. This difference in range requirements must be taken into account in the specification design of the circuit.

Thus, there has been shown and described means for providing dual threshold squelch circuits for a communications system. By this means, units transmitting a coded tone with a message will be received within a narrower range than those messages lacking the code tone, thus preventing interfering transmissions from two priority receivers. While the invention has been shown and described within the context of a particular type of communication system, the invention has application in a broad range of circuits and systems, and no limitation is to be construed from the description hereinabove.

What is claimed is:

1. A dual threshold squelch control circuit for use with received signals which may contain a coded tone in addition to the intelligence signals for controlling a receiver squelch circuit, the control circuit comprising in combination:

first detector means responsive to the reception of a usable carrier signal;

second detector means responsive to the reception of a predetermined coded tone on said received signal;

low frequency amplifying means;

first circuit means for coupling an output signal of the first detector means to a signal input of the amplifier means;

switching means for controlling the amplitude of the output signal of the amplifying means;

second circuit means for coupling an output signal of the second detector means to the switching means for enabling said switching means when the coded tone is detected; and third circuit means for coupling the controlled output of the amplifying means to the squelch circuit for enabling said squelch circuit.

2. A dual threshold squelch control circuit in accordance with claim 1 wherein the switching means comprises a transistor and a resistor, and wherein, in response to the coded tone detection signal, the transistor couples the resistor to the amplifying means for changing the gain of said amplifying means.

3. A dual threshold squelch control circuit in accordance with claim 2 wherein the low frequency amplifying means includes adjustable divider means for varying the portion of the output signal of the amplifying means coupled to the squelch circuit.

4. A dual threshold squelch control circuit in accordance with claim 1 wherein the low frequency amplifying means comprises a differential amplifier and high pass filter.

5. a dual threshold squelch control circuit in accordance with claim 1 wherein the circuit further includes two adjustable divider means coupled to the amplifier output and wherein the switching means couples ones of the divider means outputs alternately to the third circuit means.

6. A dual threshold squelch control circuit in accordance with claim 5 wherein the switching means comprises three voltage-controlled switching circuits, the first switching circuit coupling the first divider means to the third circuit means, the second switching circuit coupling the second divider means to the third circuit means, the third switching circuit coupled to operate the first and second switching circuits oppositely.

7. A dual threshold squelch control circuit in accordance with claim 5 and wherein the switching means comprises three voltage-controlled switching circuits and the second and third switching circuits and directly controlled by the output signal of the second detector means, and the first switching circuit is coupled to the third switching circuit for being operated oppositely to the second switching circuit.

* * * * *